United States Patent [19]
Boaz

[11] Patent Number: 5,328,753
[45] Date of Patent: Jul. 12, 1994

[54] GLASS SHEETS HAVING PAINTED EXTERIOR SURFACES

[75] Inventor: Premakaran T. Boaz, Livonia, Mich.

[73] Assignee: Ford Motor Company, Dearborn, Mich.

[21] Appl. No.: 968,912

[22] Filed: Oct. 30, 1992

[51] Int. Cl.$^5$ .................... B32B 17/00; C03B 23/035
[52] U.S. Cl. .................... 428/210; 428/413; 428/325; 428/432; 428/433; 428/539.5; 428/689; 428/697
[58] Field of Search .................... 428/413, 539.5, 689, 428/697, 210, 432, 433, 325; 65/25.4

[56] References Cited

U.S. PATENT DOCUMENTS

| | | |
|---|---|---|
| 2,119,608 | 6/1938 | Stewart . |
| 4,684,389 | 4/1987 | Boaz .................... 65/24 |
| 5,090,983 | 2/1992 | Boaz .................... 65/25.4 |
| 5,180,285 | 1/1993 | Lau .................... 428/697 X |

FOREIGN PATENT DOCUMENTS

| | | |
|---|---|---|
| 0270255 | 6/1988 | European Pat. Off. . |
| 0466343 | 1/1992 | European Pat. Off. . |
| 2103479 | 4/1971 | France . |
| 0041477 | 3/1984 | Japan .................... 428/697 |
| 1031363A | 2/1986 | Japan .................... 428/697 |
| 9110563 | 7/1991 | PCT Int'l Appl. . |

*Primary Examiner*—P. C. Sluby
*Attorney, Agent, or Firm*—Lorraine S. Melotik; Roger L. May

[57] ABSTRACT

A process for painting the surface of a glass sheet, and the products produced thereby. The process comprises applying a layer of a metal-containing ceramic paint to the surface of the glass sheet, heating and forming the glass sheet to fuse the metal-containing ceramic paint layer to the surface of the glass sheet, and applying a layer of organic paint over the layer of metal-containing ceramic paint.

5 Claims, No Drawings

GLASS SHEETS HAVING PAINTED EXTERIOR SURFACES

FIELD OF THE INVENTION

This invention relates generally to glass sheets having painted exterior surfaces. More particularly, the invention is directed to a method for painting the exterior surfaces of glass sheets with successive layers of paints which provides an aesthetically appealing yet durable product useful for automotive and architectural glazings.

BACKGROUND OF THE INVENTION

It is known to use ceramic paints to coat at least a portion of the surface of a glass sheet, to form an opaque border around the peripheral marginal surface thereof, for the preparation of an automotive vehicle windshield, sidelite, or backlite. Such a concealment band is applied to the inner surface of the glass sheet (the side of the glass sheet nearest the vehicle occupants) to protect the ceramic paint layer from the corrosive and erosive effects of the atmosphere exterior of the vehicle. The need to protect such a painted surface from the corrosive effects of atmospheric gases and vapors is particularly great where the ceramic paint contains a metal powder.

Metal powders are used extensively in modern ceramic paints due to their ability to prevent sticking of the paint to a forming die during a glass sheet press bending operation and their ability to prevent the formation of surface defects during a gas hearth glass sheet forming operation. Thus, virtually all modern motor vehicle glazings having a concealment band around the periphery thereof employ a ceramic paint layer on the interior surface of the glass.

U.S. Pat. Nos. 4,684,389 and 5,090,983, both to Boaz, disclose metal-containing ceramic paints useful for forming a concealment band on an automotive glazing. Such a concealment band is only applied to the interior surface of the glass sheet due to its susceptibility to the corrosive and erosive effects of the atmosphere exterior of the vehicle.

Modern styling changes have resulted in a desire to place concealment bands on the exterior surfaces of automotive glazings. Ceramic paints containing metal powders are superior to conventional ceramic paints, due to their ability to prevent sticking and defects during glass sheet forming operations. The use of metal containing ceramic paints results in increased glazing productivity and painted surface quality. However, the addition of metal powders also results in a particularly unsuitable exterior paint.

Organic paints, which provide superior durability and aesthetic quality, will not stick to a glass surface, and so likewise cannot be used to form a concealment band on the exterior surface of an automotive glazing.

It would be desirable to develop a process for painting at least a portion of the exterior surface of a glass sheet, which painted surface would be durable, resistant to atmospheric gases and vapors, and aesthetically pleasing.

SUMMARY OF THE INVENTION

Accordant with the present invention, a process for painting the exterior surface of a glass sheet surprisingly has been discovered. The process comprises the steps of:

A) applying a layer of a metal-containing ceramic paint to the exterior surface of the glass sheet;

B) heating the glass sheet to its plastic set temperature and forming the glass sheet, the heating being sufficient to fuse the metal-containing ceramic paint to the exterior surface of the glass sheet; and C) applying a layer of an organic paint over the layer of metal-containing ceramic paint.

The present invention also includes the painted glass sheets produced by the novel process. Moreover, the present invention includes a process for improving the adhesion between a layer of an organic paint and the surface of a glass sheet.

The painted glass sheets of the present invention are particularly well suited for preparing automotive or architectural glazings having concealment bands on the exterior surfaces thereof.

DETAILED DESCRIPTION OF THE PREFERRED EMBODIMENT

The present invention is directed to a process for painting the exterior surface of a glass sheet, by applying consecutive layers of a metal-containing ceramic paint and an organic paint. By the term "exterior" as it is used herein is meant that surface of the glass sheet which is intended to be exposed to the corrosive and erosive effects of the atmosphere exterior of the vehicle or building enclosed by the glass sheet. By the term "surface of the glass sheet" as it is used herein is meant the entire area of either major surface of the glass sheet, or any portion thereof.

Metal-containing ceramic paints may be applied to the surface of a glass sheet utilizing conventional paint application methods, e.g., screen printing. In a screen printing operation, the metal-containing ceramic paint is spread across a screen superimposed over the glass sheet using a squeegee to force the paint through the screen pattern onto the surface of the glass sheet. This method may be employed to prepare, for example, the first layer of a concealment band positioned on the peripheral marginal exterior surface of an automotive glazing. Such concealment bands are well-known as useful for preventing the degradation of adhesives used to mount the glazing in a vehicle opening as a result of exposure to ultra violet solar radiation, and for concealing attachment hardware and structural components which lie below the edge of the glazing. The concealment band generally extends to the edges of the glazing, and has a width sufficient to conceal the underlying adhesive and structural components, but is sufficiently narrow to provide maximum vision to occupants of the vehicle. The process for silk screening a ceramic paint onto glass is more fully set forth in U.S. Pat. No. 4,770,685 to Boaz which is incorporated herein in its entirely by reference thereto.

According to the present invention, the glass sheet having the metal-containing ceramic paint on the exterior surface thereof is conveyed through a furnace where the glass sheet is heated to its plastic set temperature. By the term "plastic set temperature" as the term is used herein is meant that temperature below which an applied stress will not cause permanent deformation of the glass sheet, and above which the glass sheet is capable of being permanently bent or shaped. During the conveying of the glass sheets through the furnace, the metal-containing ceramic paint is fused together and to the surface of the glass sheet. The temperature required is generally from about 900° F. to about 1,100° F. The time required for fusing the metal-containing ceramic paint to the surface of the glass sheet is generally from about 1 to about 5 minutes. The metal particles at least partially oxidize at the elevated temperatures within the furnace. The partially oxidized metal particles prevent adhesion of the metal-containing ceramic paint to a forming mold in a subsequent press bending operation, or prevent the formation of surface defects such as scratches during an alternative gas hearth forming process. Thus, metal particle enrichment of the ceramic paint provides a smooth, defect free painted surface, whether the softened glass sheet is formed by a press bending or gas hearth forming operation. The use of metal particles as a component in ceramic paints for use in press bending and gas hearth forming processes is more fully set forth in U.S. Pat. Nos. 4,684,389 and 5,090,983, both to Boaz, which are incorporated herein in their entirely by reference thereto.

After forming the glass sheet having the metal-containing ceramic paint layer fused to the surface thereof, a layer of an organic paint is applied over the layer of metal-containing ceramic paint. The organic paint, which otherwise would not stick to the surface of the glass sheet, adheres tenaciously to the exposed surface of the metal-containing ceramic paint layer. It surprisingly has been discovered that an organic paint adheres to a metal-containing ceramic paint layer. Thus, the non-metal-containing ceramic paints known in the prior art will not provide the benefits and advantages of the present invention.

The organic paint layer is durable, i.e., resistant to light abrasion and the corrosive and erosive effects of atmospheric gases and vapors. Moreover, the organic paint layer is aesthetically pleasing in appearance, because the surface of the underlying metal-containing ceramic paint layer is defect-free. The organic paint may be applied by conventional painting techniques such as, for example, screen printing or spraying through a mask.

By contrast, the use of conventional ceramic paints below the organic paint layer, which ceramic paints do not contain metal particles, results in a ceramic paint layer having surface defects due to sticking of the ceramic painted surface to a press bending forming die or due to sliding engagement of the ceramic painted surface with the forming blocks in a gas hearth forming operation. Thus, the overlying organic paint layer will also contain surface defects.

The glass sheet of the present invention, having the exterior surface painted with consecutive layers of a metal-containing ceramic paint and an organic paint, is more durable and aesthetically pleasing than a glass sheet having a single layer of either a metal-containing ceramic paint or an organic paint, or consecutive layers of a non-metal-containing ceramic paint and an organic paint.

The metal-containing ceramic paint used for the first layer according to the present invention comprises ceramic frit, pigment, a vehicle, and metal powder.

Suitable ceramic frits for preparing the metal-containing ceramic paints of the present invention include one or more glass frits prepared from conventional lead borosilicate glass compositions that are high in lead content, or from a zinc alkali or bismuth alkali borosilicate material. Alternatively, the frit may comprise a combination of metal oxides such as those selected from the group consisting of oxides of zinc, lead, titanium, zirconium, sodium, boron, lithium, potassium, calcium, aluminum, tin, vanadium, molybdenum, magnesium, iron, manganese, and the like. The frit is prepared by melting the frit batch ingredients at temperatures from about 1,650° F. to about 2,900° F., and then quenching the molten frit composition either with the use of water or by pouring the melt between cooled metal rolls rotating in opposite directions. The resulting chunks of frit are then ground into fine particles so as to pass through a 325 U.S. Standard Sieve mesh screen. A lead borosilicate glass frit high in lead content is preferred because it is readily available and relatively inexpensive. The frit is generally added to the ceramic paint composition at a concentration from about 20% to about 60% by weight. Preferably, the concentration of ceramic frit in the ceramic paint composition is from about 30% to about 50% by weight.

Pigments for use according to the present invention generally comprises mixtures of metal oxides which together act as a coloring agent for the ceramic paint. These metal oxides include, but are not limited to, oxides of chromium, cobalt, nickel, manganese, iron, or copper. Mixtures of these metal oxides form various colors, as is well known in the art of glass making. A particularly useful mixture of metal oxides for applying a ceramic paint concealment band to a peripheral marginal surface of an automotive glazing is conventionally known in the art as black oxide powder. The metal oxide pigments are non-reactive with one another, as well as non-reactive with other compounds contained in the ceramic paint or the glass to which the ceramic paint is applied, up to temperatures of about 1,300° F. The concentration of pigment in the ceramic paint composition generally may be from about 5% to about 30% by weight. Preferably, the concentration is from about 10% to about 20% by weight.

Vehicles suitable for use in the metal-containing ceramic paint composition of the present invention generally comprise organic materials which allow the paint to flow at application temperatures. Examples of useful vehicles include, but are not necessarily limited to, pine oil, vegetable oils, mineral oils, hot melt materials, ultraviolet curable polymer resins, low molecular weight petroleum fractions, vinyl resins, thermoplastic resins, polyolefins, solvents, and the like, as well as mixtures thereof. A preferred vehicle is pine oil. The vehicle may comprise from about 0.1% to about 25% by weight of the metal-containing ceramic paint composition.

Metal powders which may be employed in the metal-containing ceramic paint of the present invention comprise, but are not necessarily limited to, powders prepared from zinc, aluminum, tin, antimony, lead, cadmium, chromium, cobalt, copper, manganese, iron, silicon, titanium, tungsten, and bismuth, as well as mixtures and alloys thereof. A preferred metal powder comprises finely divided zinc metal powder. The metal powder is generally present in the ceramic paint composition at a concentration from about 5% to about 60% by weight of the metal-containing ceramic paint. Preferably, the concentration is from about 10% to about 40% by weight of the metal-containing ceramic paint.

Conventional adjuvants such as, for example, fillers, thermal stabilizers, ultraviolet energy absorbers, dyes, and the like, as well as mixtures thereof, may also be included in the metal-containing ceramic paint in amounts generally not exceeding 50% by weight of the paint.

The organic paint which is placed over the metal-containing ceramic paint layer may be selected from any of the paints which are known as useful for decorating articles. Organic paints generally comprise a pigment, a solvent, and an organic base material such as, for example, an acrylic, cellulosic, alkyd, epoxy, fluorocarbon, phenolic, polyamide, polyurethane, or vinyl resin, as well as blends and copolymers thereof. Preferred paints include enamels, epoxy-based paints, and lacquers such as those currently used in the automotive industry. It will be apparent to those normally skilled in the art that more than one organic paint layer may be applied to the layer of metal-containing ceramic paint, depending upon the appearance desired. A particularly useful organic paint is H D acrylic enamel made by E. I. DuPont deNemours Co. of Wilmington, Del.

The invention is more easily comprehended by reference to the specific embodiments described herein which are representative of the invention. It must be understood, however, that the specific embodiments are provided only for the purposes of illustration and understanding, and that the invention may be practiced otherwise than as specifically described without departing from its spirit or scope.

What is claimed is:

1. A painted glass sheet, comprising:
   A) a sheet of glass, having an exterior surface;
   B) a layer of metal-containing ceramic paint comprising ceramic frit, pigment, a vehicle, and metal powder fused to at least a portion of the exterior surface of the glass sheet, wherein said metal powder is prepared from the group of metals consisting of zinc, aluminum, tin, antimony, lead, cadmium, chromium, cobalt, copper, manganese, iron, silicon, titanium, tungsten, bismuth, and mixtures and alloys thereof; and
   C) a layer of organic paint adhered to the layer of metal-containing ceramic paint.

2. The paint glass sheet according to claim 1, wherein the metal is zinc.

3. The painted glass sheet according to claim 1, wherein the organic paint is selected from the group consisting of enamels, epoxy based paints, and lacquers.

4. An automotive glazing having a concealment band on the exterior surface thereof, comprising:
   A) an automotive glazing, having an exterior surface;
   B) a layer of metal-containing ceramic paint comprising ceramic frit, pigment, a vehicle, and metal powder fused to the peripheral marginal exterior surface of the glazing, the metal powder prepared from the group of metals consisting of zinc, aluminum, tin, antimony, lead, cadmium, chromium, cobalt, copper, manganese, iron, silicon, titanium, tungsten, bismuth, and mixtures and alloys thereof; and
   C) a layer of organic paint adhered to the layer of metal-containing ceramic paint, the organic paint selected from the group consisting of enamels, epoxy-based paints, and lacquers.

5. The automotive glazing according to claim 4, wherein the metal is zinc.

* * * * *